(12) United States Patent
Allen, III et al.

(10) Patent No.: US 6,557,860 B1
(45) Date of Patent: May 6, 2003

(54) COLLET RETAINER

(75) Inventors: Clifford W. Allen, III, Lexington, KY (US); Theodore P. O'Canna, Versailles, KY (US); Marshall B. Reynolds, Jr., Lexington, KY (US)

(73) Assignee: Lexair, Inc., Lexington, KY (US)

( * ) Notice: Subject to any disclaimer, the term of this patent is extended or adjusted under 35 U.S.C. 154(b) by 48 days.

(21) Appl. No.: 09/932,498

(22) Filed: Aug. 17, 2001

(51) Int. Cl.[7] .............................................. B23B 31/20
(52) U.S. Cl. .............................. 279/4.09; 279/5; 279/50; 279/137; 409/221
(58) Field of Search .............................. 279/4.07–4.09, 279/47, 48, 50–53, 137, 5; 409/221–223

(56) References Cited

U.S. PATENT DOCUMENTS

| | | | | |
|---|---|---|---|---|
| 2,621,938 A | * | 12/1952 | Ziegler | 279/50 |
| 5,110,146 A | * | 5/1992 | Beere | 279/50 |
| 5,462,294 A | * | 10/1995 | Wendhack | 279/51 |
| 5,482,300 A | * | 1/1996 | Wendhack | 279/51 |
| 5,855,377 A | * | 1/1999 | Murphy | 279/50 |

\* cited by examiner

Primary Examiner—Steven C. Bishop
(74) Attorney, Agent, or Firm—Frank C. Leach, Jr.

(57) ABSTRACT

Each of a plurality of passages in a fixture has a piston movable therein and cooperating with a collet therein to simultaneously move each collet to its workpiece retaining position and to release each collet from its workpiece retaining position. A recess in the bottom of the fixture supports a locking nut for each passage. Each locking nut has a circular passage extending therethrough to receive an end of the collet having threads on its outer surface. The circular passage has threads of the same pitch but the threads have an interrupted portion in the circumferential and axial directions. The locking nut has a first portion movable relative to a second portion to take up the pitch clearance in the threads on the collet due to the interrupted portion of threads in the circular passage to prevent rotation of the collet prior to the piston moving the collet to its workpiece retaining position.

42 Claims, 13 Drawing Sheets

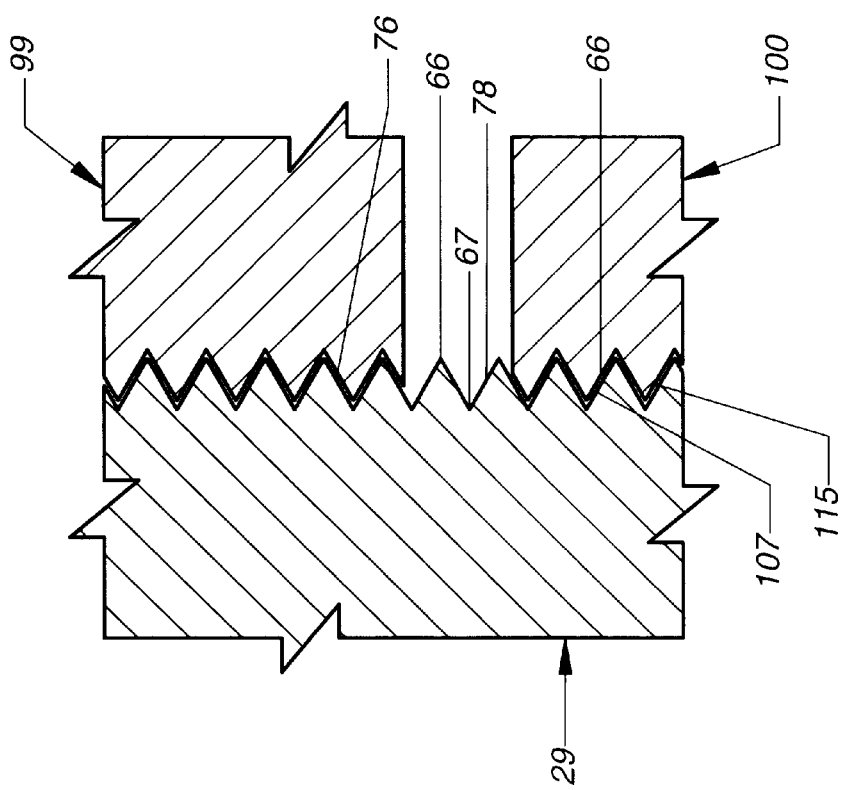
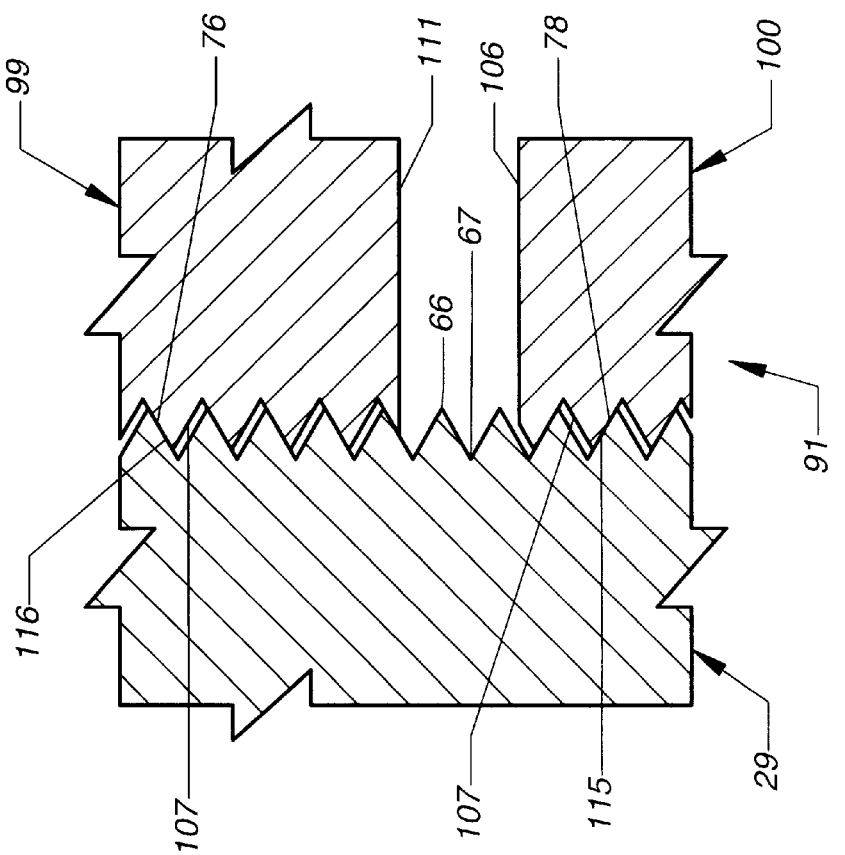

COLLET RETAINER

This invention relates to a collet retainer and, more particularly, to a collet retainer in which a collet may be disposed at any rotatable position relative to the collet retainer in which it is rotatably supported and retained against movement.

Collets are employed to hold workpieces for machining operations, for example. One means of presently holding collets against rotation is by a locking pin extending into a longitudinal slot in threads in the outer surface of the collet. Thus, the collet may not be disposed in any rotatable position but only at one specific position through 360° at which the locking pin can extend into the longitudinal slot in the threads in the outer surface of the collet.

A disadvantage of this collet locking arrangement is that a user may fail to dispose the locking pin in the longitudinal slot in the threads in the outer surface of the collet. This can damage the threads whereby the collet may no longer be usable. With relatively large size collets, this is a relatively expensive cost.

Another disadvantage of this collet locking arrangement is that a fixture, which has a plurality of collets, cannot have the collets disposed too close together. This is because of the need for access to each of the locking pins extending into one of the longitudinal slots in the threads in the outer surface of one of the collets. Therefore, when it is desired to have a number of the collets holding the same workpieces for the same machining operation, for example, the need for accessibility to the locking pin restricts the number of collets in a given support area on a fixture. Thus, maximum utilization of the support area is not obtained.

When it is desired to change the orientation of a non-round workpiece relative to the fixture in which the collet is rotatably supported, the collet must be rotated. As a result, the longitudinal slot in the collet could be positioned so that the locking pin cannot align with the longitudinal slot whereby the desired orientation of the non-round workpiece relative to the fixture is not possible.

The collet retainer of the present invention satisfactorily overcomes the foregoing disadvantages of the collet retainers in which each of the locking pins extends into one of the longitudinal slots in the threads in the outer surface of one of the collets. The collet retainer of the present invention does not require a longitudinal slot in the threads in the outer surface of the collet. This eliminates the possibility of damage to the threads in the outer surface of the collet by the locking pin when there is not alignment of the longitudinal slot with the location of the locking pin.

The collet retainer of the present invention utilizes a locking nut for cooperating with the threads in the outer surface of the collet to lock the collet against rotation. This allows the collet to be disposed at any rotatable position relative to its longitudinal axis. This enables more precise adjustment than is presently available for the orientation of the non-round workpiece, for example. Even with only a slight difference in the adjustment of the orientation of the non-round workpiece due to the pitch of the threads in the outer surface of the collet, this can result in the orientation of the non-round workpiece not being at the desired position when employing the collet with the longitudinal slot in the threads in the outer surface of the collet to receive the locking pin.

When used in a fixture, the collet retainers of the present invention do not require the same total support area as the same number of the previously discussed collet retainers. This is because there is no need for accessibility on any side of the fixture as is necessary when using the collet retainer having the locking pin for disposition in the longitudinal slot in the threads in the outer surface of the collet.

Instead, the collet is locked against rotation in the collet retainer of the present invention through turning a collet locking screw. The collet locking screw for each collet is accessible from the top of the fixture. Thus, there is no need for any lateral spacing in the fixture between the various collet retainers of the present invention as has previously been necessary.

An object of this invention is to provide a collet retainer for retaining a collet at any desired rotatable position within the collet retainer.

Another object of this invention is to provide collet retainers in a fixture having no requirement for accessibility from a side to lock each collet against rotation.

Other objects of this invention will be readily perceived from the following description, claims, and drawings.

The attached drawings illustrate preferred embodiments of the invention, in which.

Figure 13:
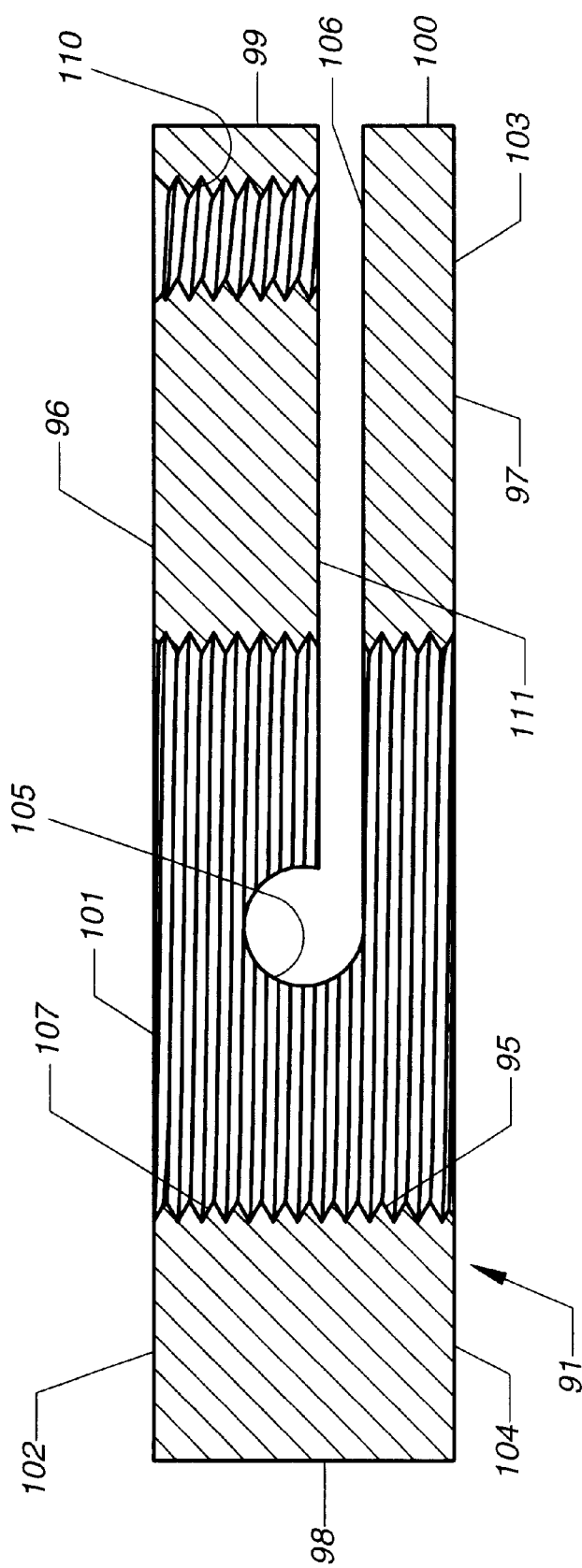
FIG. 13 is a sectional view of another embodiment of the locking nut of the present invention used to retain the collet against rotation and showing a portion of threads of a circular passage in the locking nut.

FIG. 14 is an enlarged fragmentary sectional view of a portion of the threads in the locking nut of FIG. 13 cooperating with threads of the same pitch in the outer surface of the collet with the collet free to rotate relative to the locking nut; and FIG. 15 is an enlarged fragmentary sectional view, similar to FIG. 14, of the same portion of the threads in the locking nut cooperating with the threads in the outer surface of the collet with the collet clamped against rotation through engagement of the threads in the locking nut with the threads in the outer surface of the collet.

Figure 3:
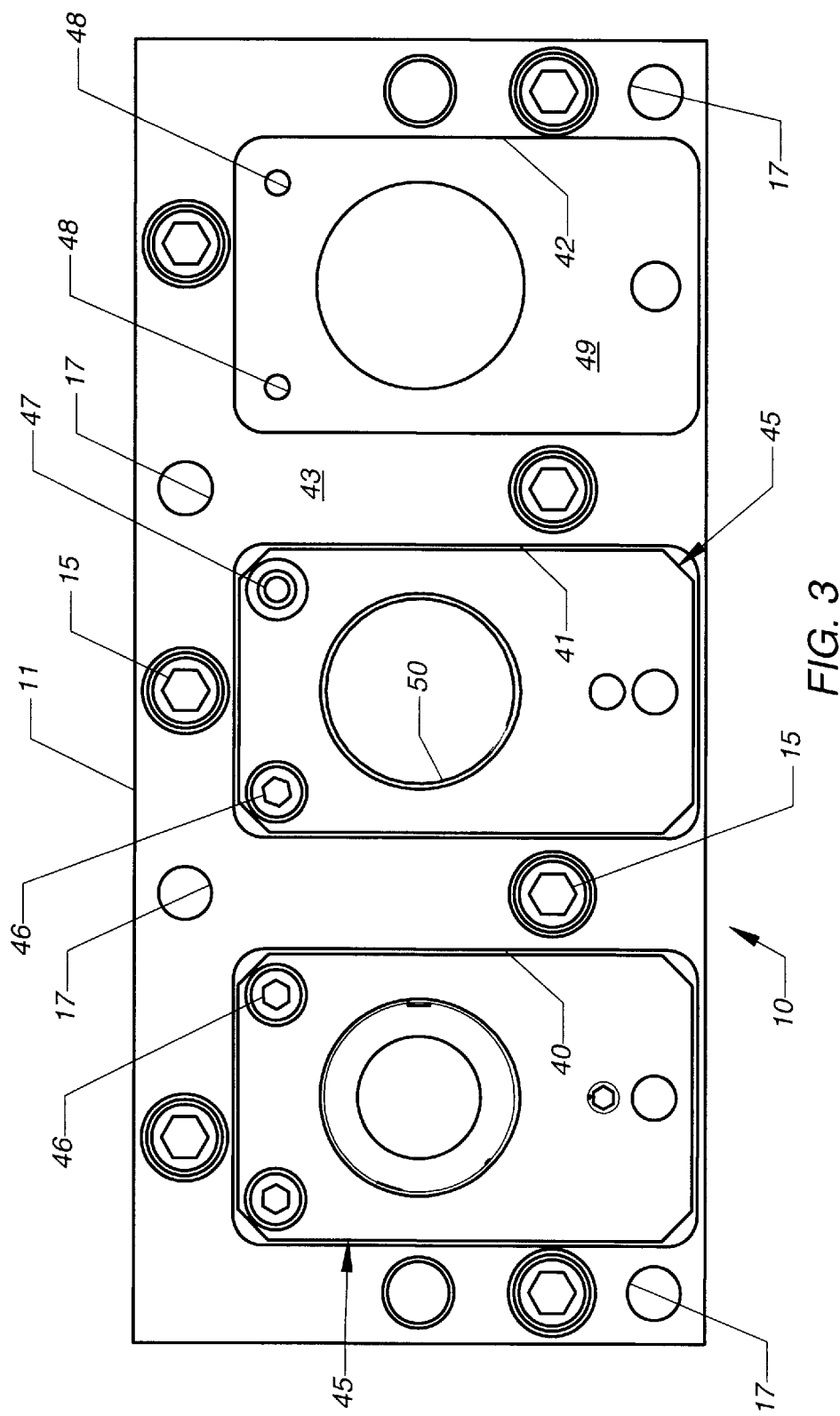
FIG. 3 is a bottom plan view of the fixture of FIG. 2 and showing a first locking nut in a first recess cooperating with a collet, a second locking nut in a second recess having no collet, and a third recess in the fixture having no locking nut.
Figure 4:
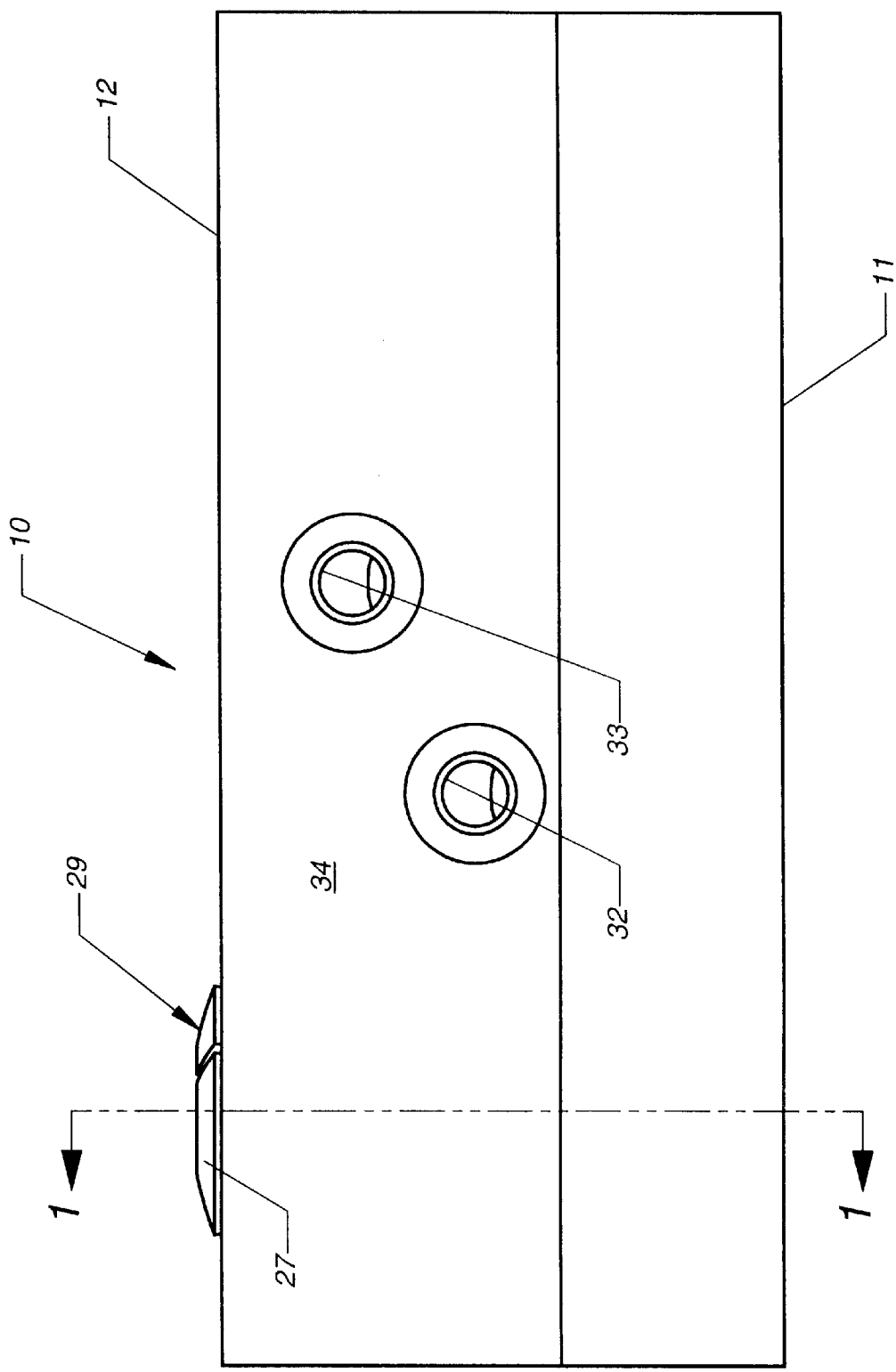
FIG. 4 is a front elevational view of the fixture of FIG. 2.

Referring to the drawings and particularly FIG. 4, there is shown a fixture 10 having a base 11 and an upper body 12 connected to each other to constitute a main body. The base 11 and the upper body 12 are attached to each other by seven screws 15 (see FIG. 3). Each of the screws 15 extends through a passage (not shown) extending through the base 11 into a threaded bore in the bottom of the upper body 12.

Four passages 16 (see FIG. 2) extend through the upper body 12 and are aligned with four passages 17 (see FIG. 3) in the base 11. Mounting screws (not shown) extend through the passages 16 (see FIG. 2) and the passages 17 (see FIG. 3) to attach the fixture 10 to a fixture plate (not shown) or a machine (not shown), for example.

Figure 2:
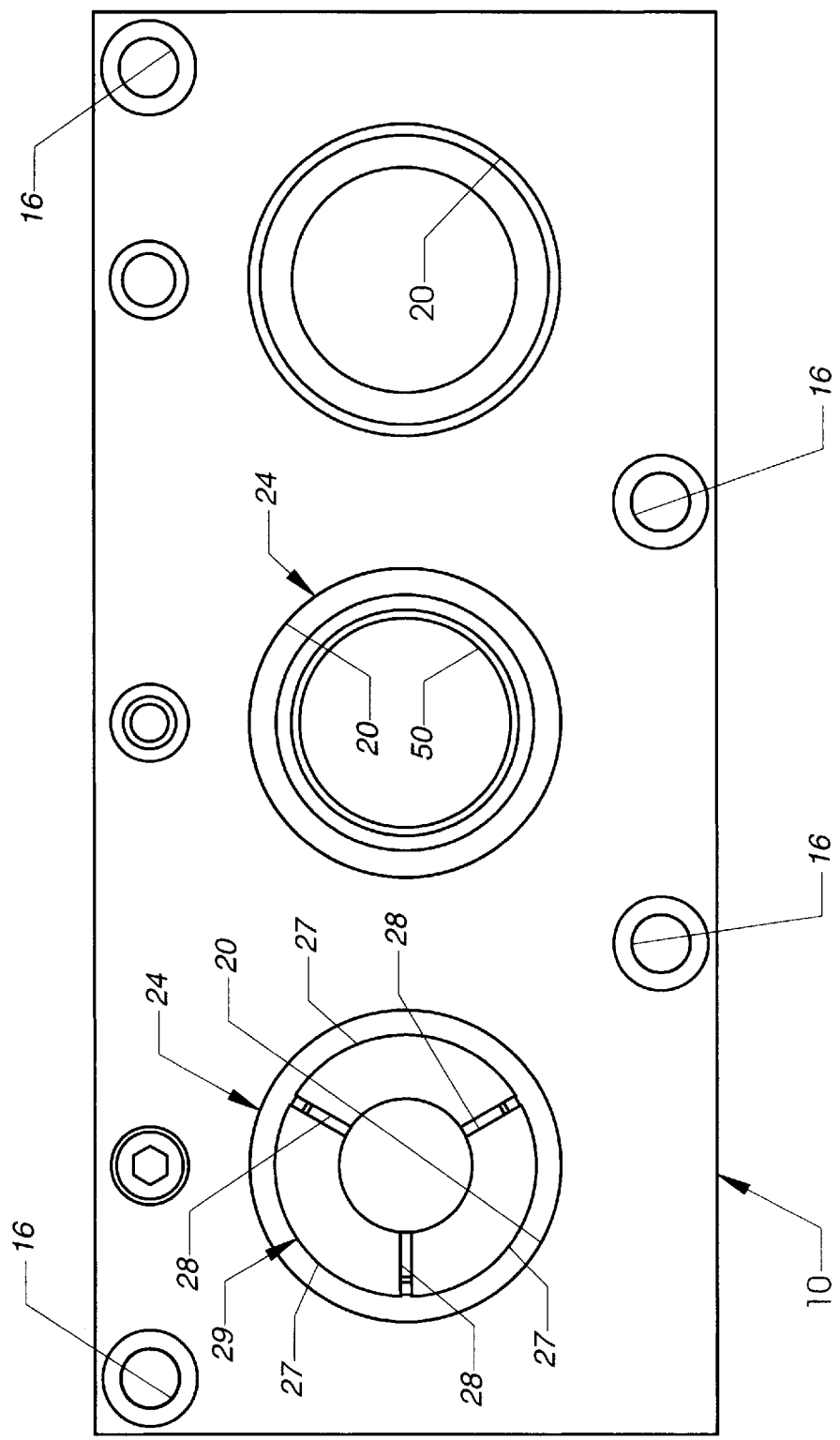
FIG. 2 is a top plan view of a fixture with only one collet disposed therein and retained by the collet retainer of the present invention.

As shown in FIG. 2, the fixture 10 has three passages 20 extending therethrough. Each of the passages 20 receives a piston 24 therein.

Although only three of the passages 20 are shown in the fixture 10, it should be understood that the fixture 10 may have any number of the passages 20. Although only movement of the piston 24 in one of the passages 20 will be described, it should be understood the operation of the piston 24 in each of the passages 20 is the same and all occur simultaneously.

Figure 1:
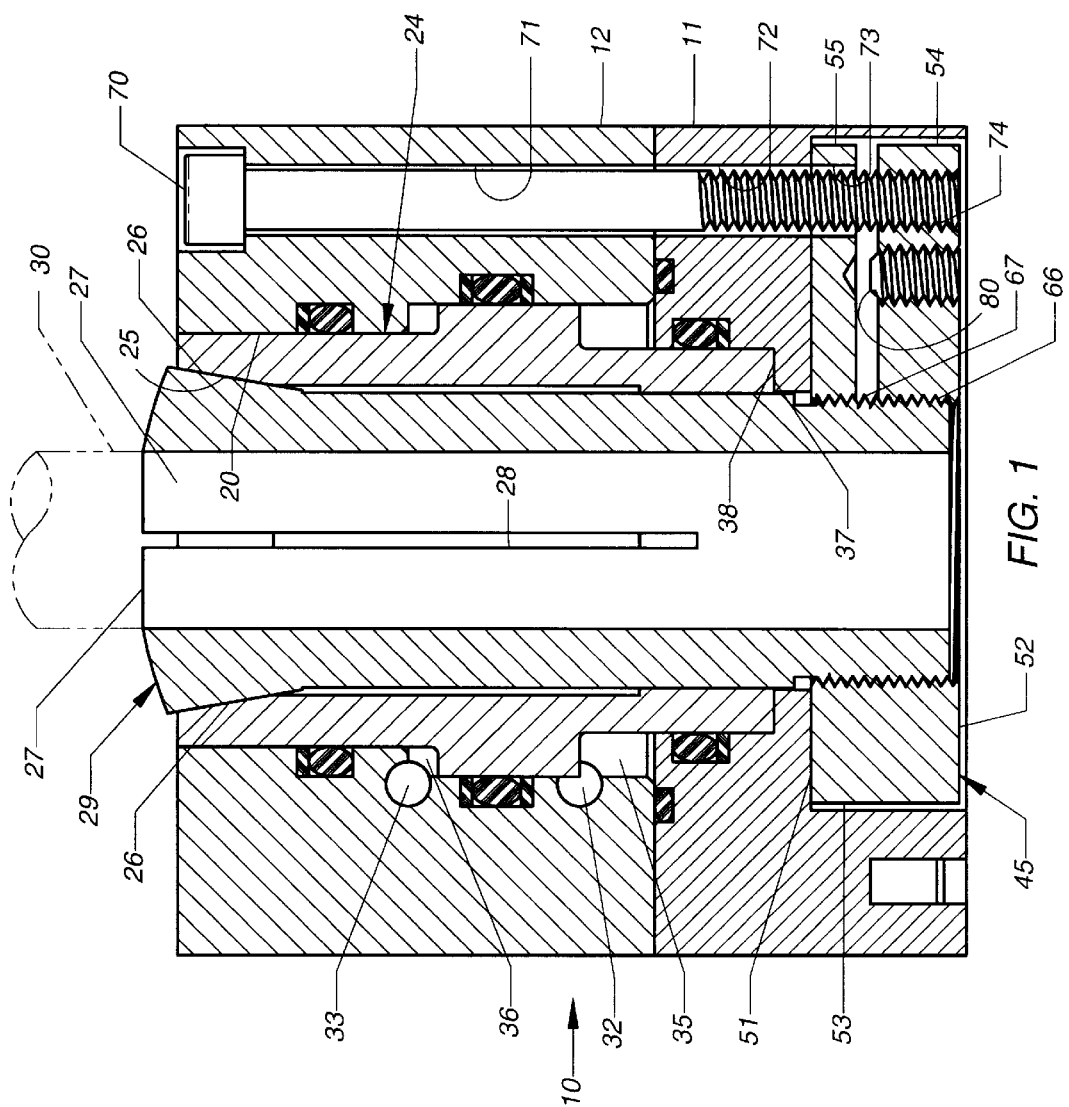
FIG. 1 is a vertical sectional view of one embodiment of a collet retainer of the present invention having a collet locked therein against rotation with a workpiece, which is clamped by the collet, shown in phantom and taken along line 1—1 of FIG. 4.

As shown in FIG. 1, the piston 24 is slidably supported in the passage 20 for movement in both vertical directions relative thereto. When the piston 24 is moved upwardly, a tapered or inclined surface 25 on the piston 24 engages tapered or inclined surfaces 26 on three split portions 27 (see FIG. 2), which are formed by longitudinal slots 28, of a collet 29. When this occurs, the collet 29 (see FIG. 1) clamps a workpiece 30 in its workpiece retaining position to prevent movement of the workpiece 30.

The piston 24 has pressurized hydraulic fluid supplied through one of two passages 32 (see FIG. 4) and 33 in the upper body 12 and removed through the other of the two passages 32 and 33. The passages 32 and 33 communicate at a front wall 34 of the upper body 12 of the fixture 10 with hoses (not shown). The hoses connect one of the passages 32 and 33 with a hydraulic pressure source such as a pump, for example, and the other with a return to a reservoir or inlet of the pump depending on the position of a directional valve.

When the passage 32 receives the pressurized hydraulic fluid, it is supplied to a chamber 35 (see FIG. 1) to move the piston 24 upwardly to cause the collet 29 to clamp the workpiece 30.

When the hydraulic fluid flow is reversed by the directional valve so that the pressurized hydraulic fluid is supplied through the passage 33 to a chamber 36 and removed from the chamber 35 through the passage 32, the piston 24 is moved downwardly to the position of FIG. 1. The piston 24 has its bottom surface 37 engage a surface 38 in the base 11 to stop downward motion of the piston 24. As a result, the collet 29 no longer clamps the workpiece 30 in the workpiece retaining position since the three split portions 27 (see FIG. 2) spring away from the workpiece 30 (see FIG. 1) when the tapered surface 25 of the piston 24 in each of the passages 20 is no longer engaging the tapered surfaces 26 of the three split portions 27 of the collet 29.

Prior to the piston 24 being moved upwardly by the pressurized hydraulic fluid supplied to the chamber 35 through the passage 32 and removed from the chamber 36 through the passage 33, it is necessary for the collet 29 to be fixed against rotation. The collet 29 is rotatably supported in the piston 24 in the fixture 10.

Accordingly, the base 11 (see FIG. 3) has three recesses 40, 41, and 42 in its bottom surface 43 although there may be any number. Each of the recesses 40–42 receives a locking nut 45, but only the recesses 40 and 41 are shown having the locking nut 45 therein. Each of the locking nuts 45 is carried by the base 11 through having two screws 46 extend through holes 47 in the locking nut 45 into threaded bores 48 in bottom surface 49 of each of the recesses 40–42.

Figure 6:
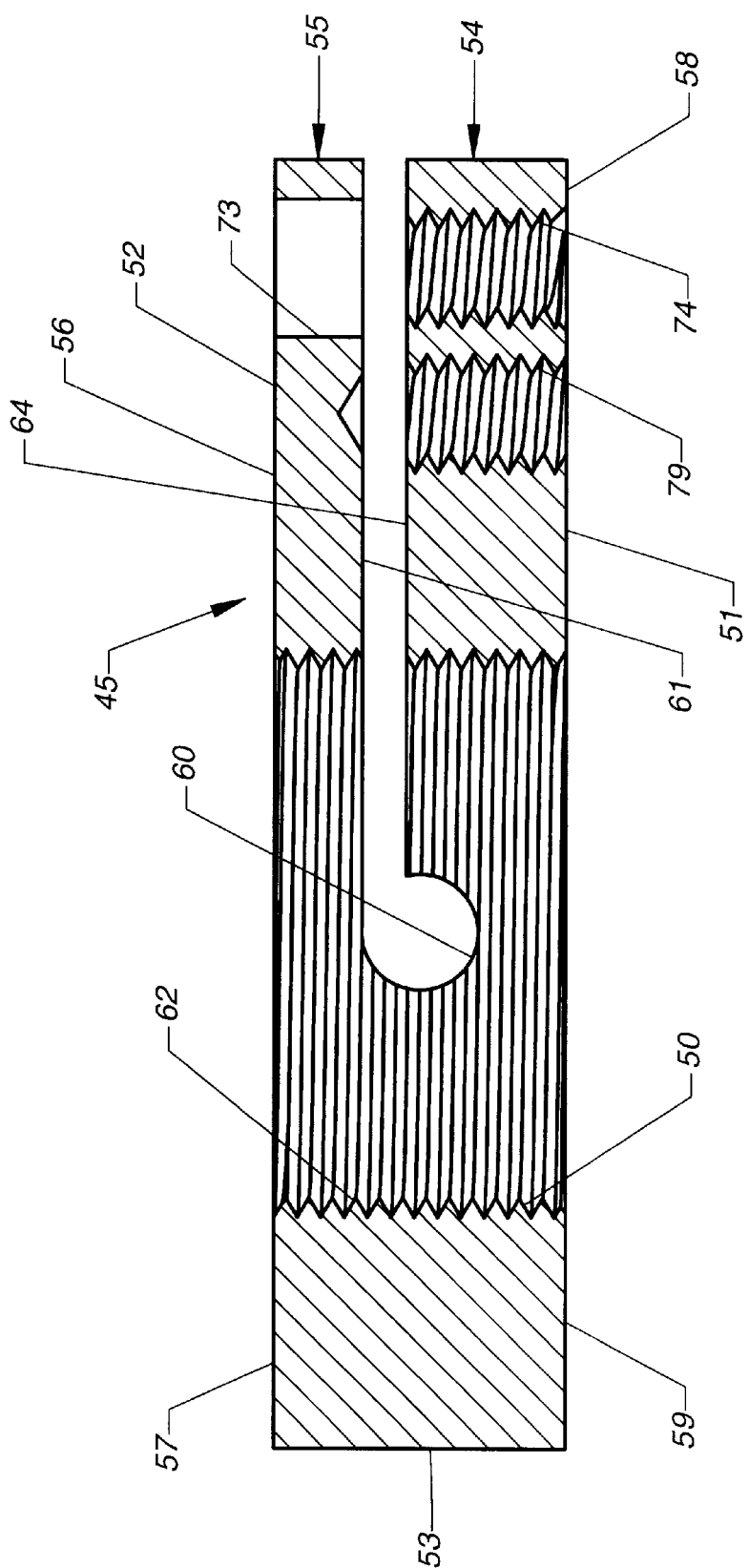
FIG. 6 is a sectional view of one embodiment of the locking nut of the present invention used to retain the collet against rotation, showing a portion of threads of a circular passage in the locking nut, and taken along line 6—6 of FIG. 5.

As shown in FIG. 6, the locking nut 45 has a circular passage 50 extending between its two substantially parallel surfaces 51 and 52. The locking nut 45 includes a main portion 53 and two separate portions 54 and 55 integral with the main portion 53.

The upper separate portion 55 has a surface 56 in the same plane as a surface 57 of the main portion 53 to constitute the upper surface 52 of the locking nut 45. The lower surface 51 of the locking nut 45 is formed by a surface 58 of the lower separate portion 54 and a surface 59 of the main portion 53. The surfaces 58 and 59 are in the same plane.

The separate portions 54 and 55 are formed by milling part of the locking nut 45. Two circular holes 60 are formed in the locking nut 45 on opposite sides of the circular passage 50.

The centers of the two holes 60 are on an axis extending through the axis of the circular passage 50 and perpendicular thereto. A lower surface 61 of the upper separate portion 55 is tangent to the circumference of each of the circular holes 60.

Figure 7:
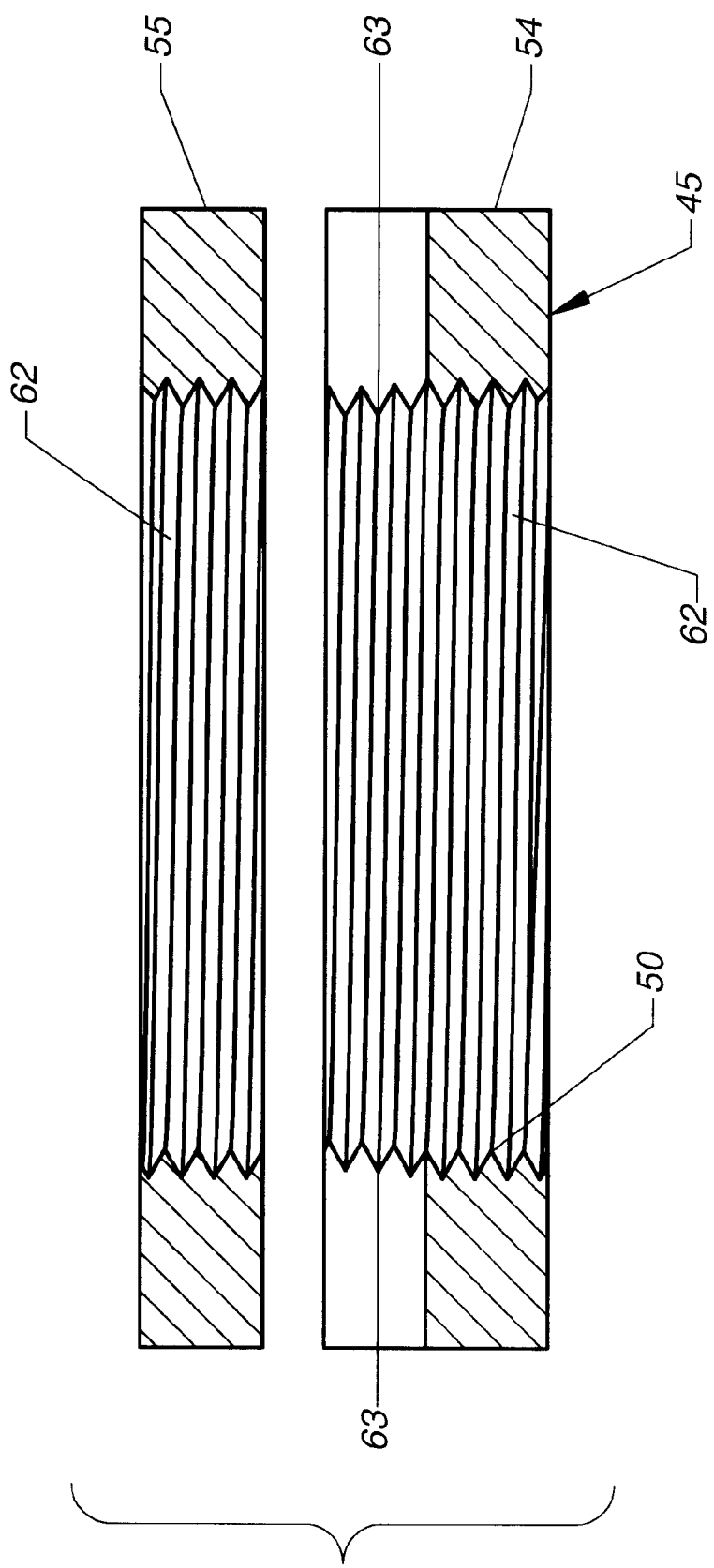
FIG. 7 is a sectional view of the locking nut of FIG. 6 and taken along line 7—7 of FIG. 5 to show another portion of the threads in the circular passage in the locking nut.
Figure 8:
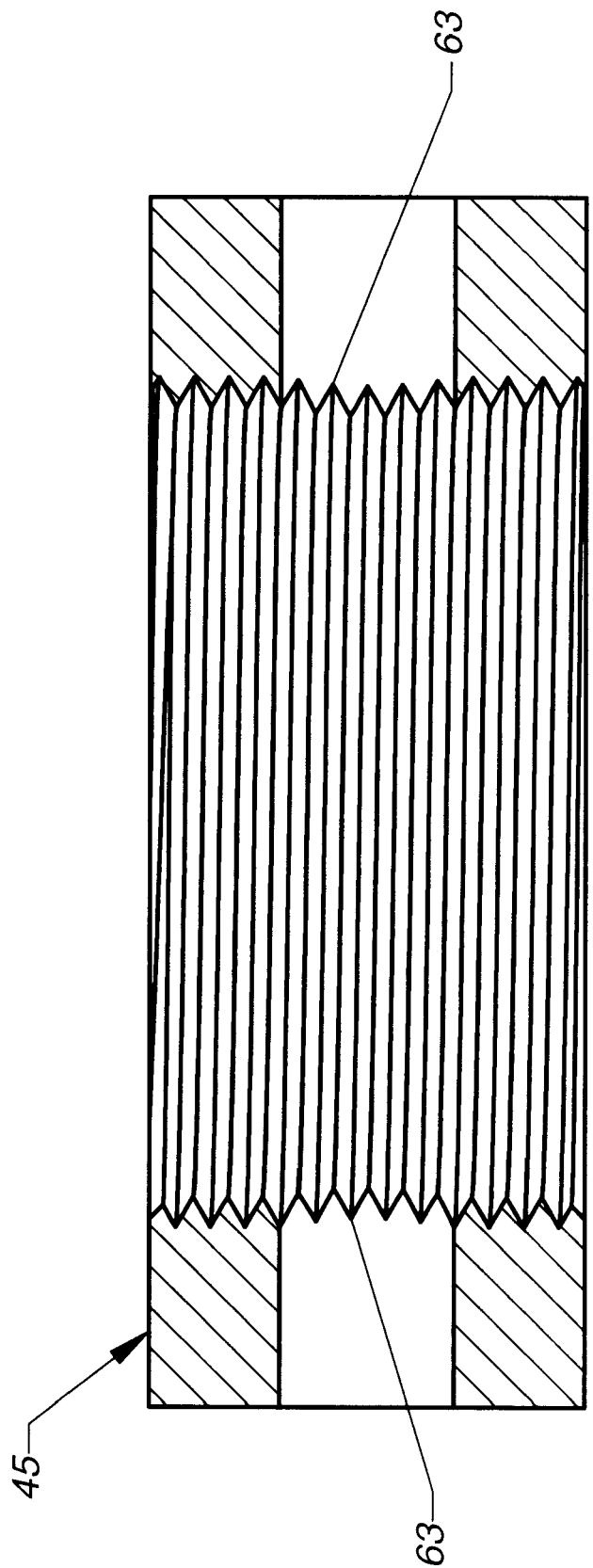
FIG. 8 is a sectional view of the locking nut of FIG. 6 and taken along line 8—8 of FIG. 5 to show a further portion of the threads in the circular passage in the locking nut.

This results in threads 62 in the circular passage 50 having an interrupted portion of a predetermined circumferential distance and a predetermined axial or vertical distance. As shown in FIG. 7, the circumferential interruption of the threads 62 in the circular passage 50 preferably extends for at least 180°. There preferably is a slight extension of the interrupted portion of the threads 62 in the axial direction beyond 180° as shown at 63 in FIGS. 7 and 8 due to the two holes 60 (see FIG. 6).

The axial distance of interruption of the threads 62 in the circular passage 50 is greatest at the location of the two holes 60 at diametrically opposite sides of the circular passage 50. The main portion 53 of the locking nut 45 does not have the threads 62 interrupted.

It should be understood that the threads 62 can extend for less than or more than 180°. However, it is believed necessary for the threads 62 to be interrupted for at least 90° and not more than 270°.

It should be understood that the axial distance of the interruption of the threads 62 varies because of the size of the holes 60. While the preferred embodiment has the two holes 60, it should be understood that the two holes 60 could be omitted.

The spacing between the lower surface 61 of the upper separate portion 55 and an upper surface 64 of the lower separate portion 54 can be selectively varied and could be as small as one thread. It is only necessary that there be an interrupted portion of the threads 62 for the present invention to function.

Figure 9:
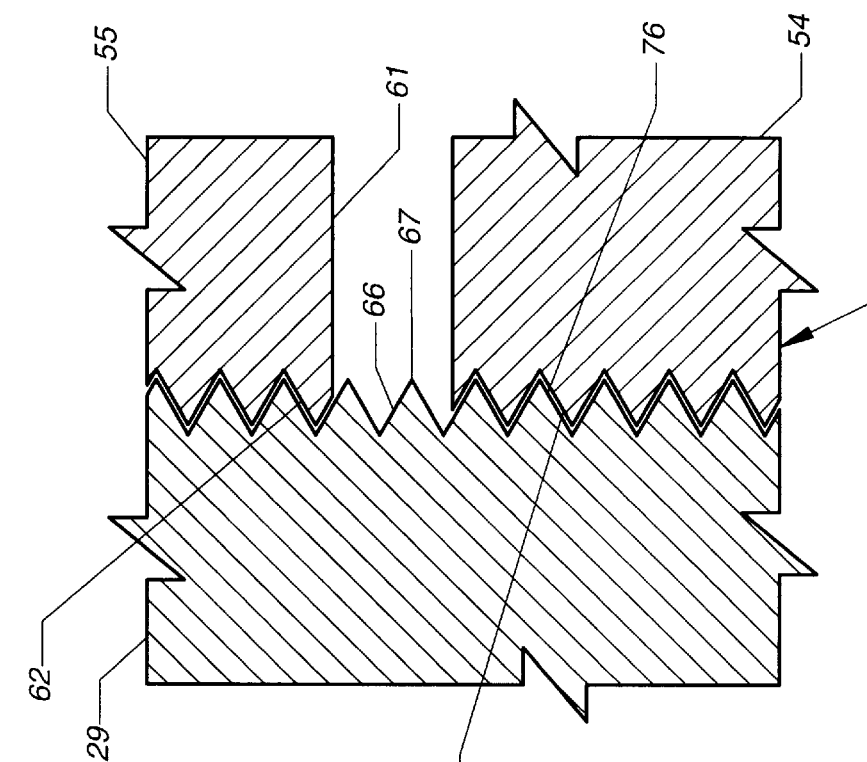
FIG. 9 is an enlarged fragmentary sectional view of a portion of the threads in the locking nut cooperating with threads of the same pitch in the outer surface of the collet with the collet free to rotate relative to the locking nut.

As shown in FIG. 9, the threads 62 cooperate with threads 66 on an outer surface 67 (see FIG. 1) of the collet 29. The threads 66 are on the lowermost portion of the collet 29.

A collet locking screw 70 extends through a passage 71 in the upper body 12, a passage 72 in the base 11, and a passage 73 in the upper separate portion 55 (see FIG. 6) of the locking nut 45 into a threaded hole 74 in the lower separate portion 54 of the locking nut 45. Rotation of the collet locking screw 70 (see FIG. 1) pulls the lower separate portion 54 of the locking nut 45 upwardly toward the upper separate portion 55 of the locking nut 45.

Figure 10:
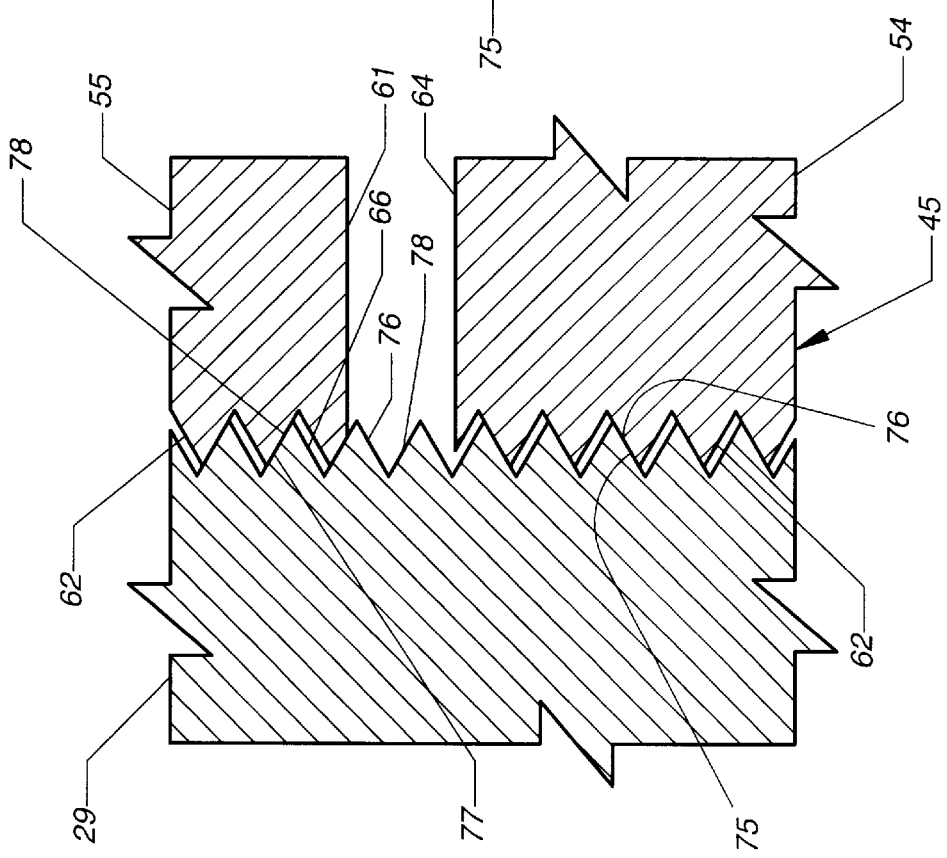
FIG. 10 is an enlarged fragmentary sectional view, similar to FIG. 9, of the same portion of the threads of the locking nut cooperating with the threads in the outer surface of the collet with the collet clamped against rotation through engagement of the threads in the locking nut with the threads in the outer surface of the collet.
Figure 11:
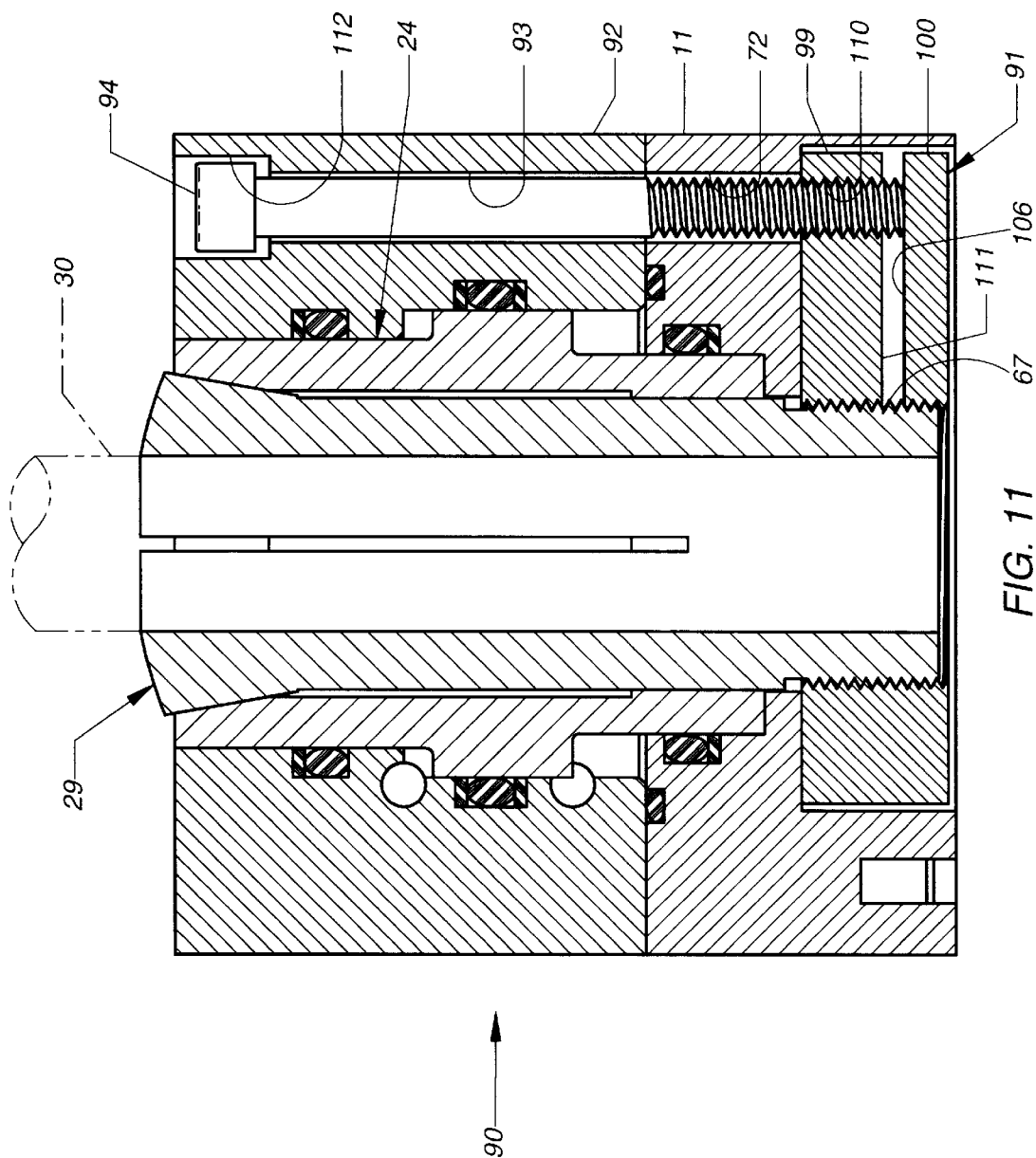
FIG. 11 is a vertical sectional view of another embodiment of a collet retainer of the present invention having a collet locked therein against rotation with a workpiece, which is clamped by the collet, shown in phantom.

As a result, an upper surface 75 (see FIG. 9) of each of the threads 62 on the lower separate portion 54 of each of the locking nuts 45 is moved into engagement with a lower surface 76 of some of the threads 66 on the collet 29 to compress the threads 62. This takes up the pitch clearance between the threads 66 on the collet 29 as shown in FIG. 10. It should be understood that the threads 62 have the same pitch as the pitch of the threads 66 on the collet 29.

The upward motion of the lower separate portion 54 also results in a lower surface 77 of each of the threads 62 on the upper separate portion 55 of each of the locking nuts 45 being engaged by an upper surface 78 of other of the threads 66. This occurs because taking up the pitch clearance between the threads 62 and 66 causes the upper surface 78 of each of the threads 66 to engage the lower surface 77 of each of the threads 62 on the upper separate portion 55.

By taking up the pitch clearance of the threads 66 on the collet 29, the collet 29 is locked against rotation. Thus, it is only necessary to rotate the collet locking screw 70 (see FIG. 1) from the top of the fixture 10 to lock the collet 29 against rotation. The collet locking screw 70 is rotated in the opposite direction to release the collet 29 from the locking nut 45. Therefore, there is no necessity for any clearance on any side of the fixture 10 for access thereto as is required by the collet retainer having the locking pin.

The lower separate portion 54 (see FIG. 6) of the locking nut 45 has a threaded hole 79 to receive a stop pin 80 (see FIG. 1). The stop pin 80 limits the upward movement of the lower separate portion 54 by engaging the upper separate portion 55 before the lower separate portion 54 can engage the upper separate portion 55.

Referring to FIGS. 11–15, there is shown another embodiment of this invention including a fixture 90. The only differences from the fixture 10 (see FIG. 1) are replacement of the locking nut 45 with a locking nut 91 (see FIG. 11), replacement of the upper body 12 (see FIG. 1) with an upper body 92 having a different passage 93 than the passage 71 (see FIG. 1) in the upper body 12, and replacement of the collet locking screw 70 with a collet locking screw 94 (see FIG. 11). The remainder of the fixture 90 will be identified by the same numbers as used with the same elements in the fixture 10 (see FIG. 1).

As shown in FIG. 13, the locking nut 91 has a circular passage 95 extending between its two substantially parallel surfaces 96 and 97. The locking nut 91 includes a main portion 98 and two separate portions 99 and 100 integral with the main portion 98.

The upper separate portion 99 has a surface 101 in the same plane as a surface 102 of the main portion 98 to constitute the upper surface 96 of the locking nut 91. The lower surface 97 of the locking nut 91 is formed by a surface 103 of the lower separate portion 100 and a surface 104 of the main portion 98. The surfaces 103 and 104 are in the same plane.

Figure 5:
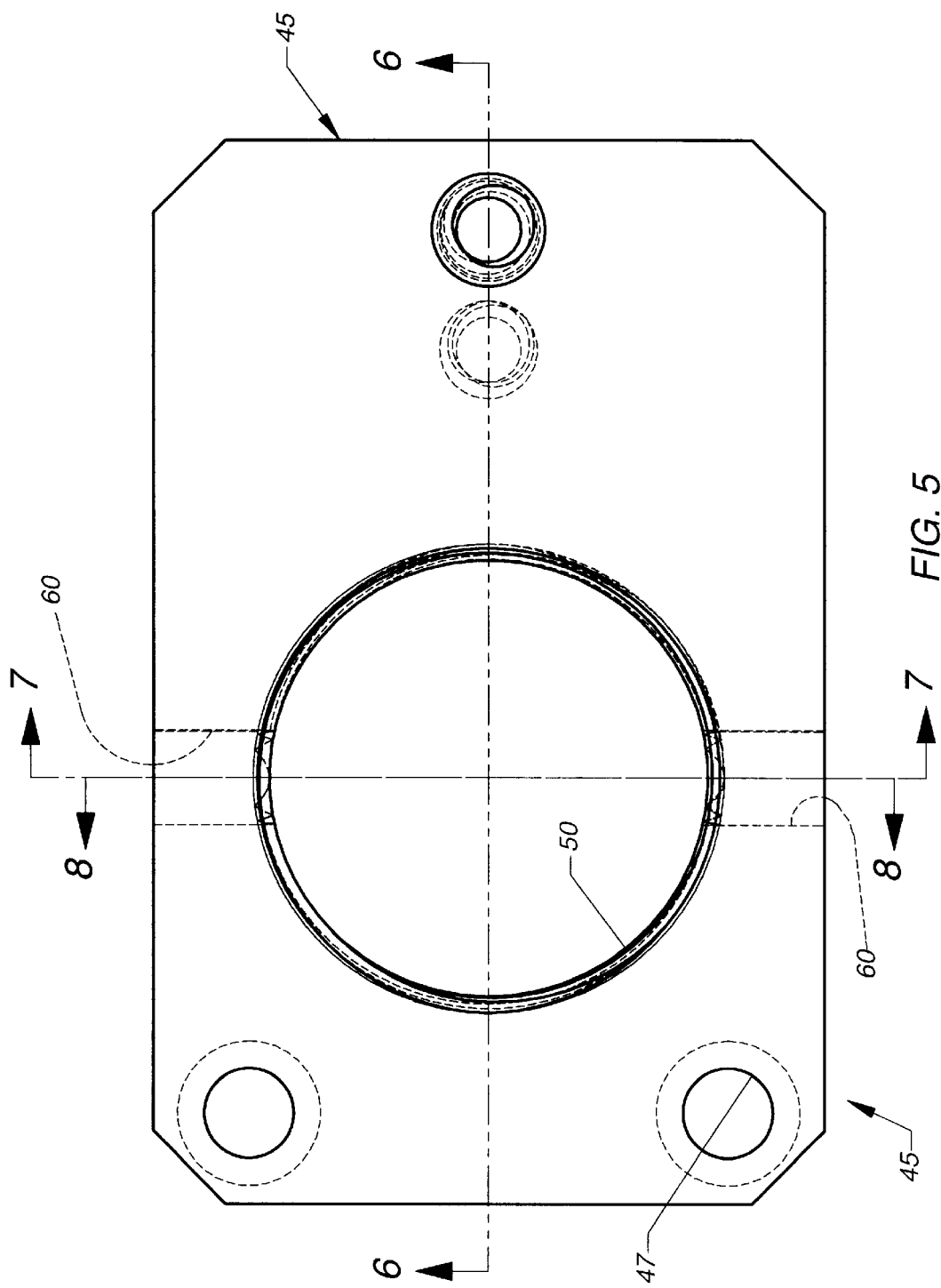
FIG. 5 is a top plan view of the locking nut of FIG. 3.

The separate portions 99 and 100 are formed by milling part of the locking nut 91. Two circular holes 105 are formed in the locking nut 91 on opposite sides of the circular passage 95 in the same manner as the two circular holes 60 (see FIG. 5) are formed in the locking nut 45.

The centers of the two holes 105 (see FIG. 13) are on an axis extending through the axis of the circular passage 95 and perpendicular thereto. An upper surface 106 of the lower separate portion 100 is tangent to the circumference of each of the circular holes 105.

This results in threads 107 in the circular passage 95 having an interrupted portion of a predetermined circumferential distance and a predetermined axial or vertical distance. The interrupted portion is the same as described for the locking nut 45 (see FIG. 6). Likewise, the axial distance of interruption of the threads 107 (see FIG. 13) in the circular passage 95 is the same as for the threads 62 (see FIG. 6) in the circular passage 50 in the locking nut 45. As shown in FIG. 14, the threads 107 cooperate with the threads 66 on the outer surface 67 of the collet 29.

The collet locking screw 94 (see FIG. 11) extends through the passage 93 in the upper body 92 and the passage 72 in the base 11 into a threaded hole 110 in the upper separate portion 99 of the locking nut 91 and extending therethrough. The collet locking screw 94 extends beyond a bottom surface 111 of the upper separate portion 99 to engage the upper surface 106 of the lower separate portion 100.

Rotation of the collet locking screw 94 pushes the lower separate portion 100 of the locking nut 91 downwardly away from the upper separate portion 99 of the locking nut 91. This downward motion of the collet locking screw 94 is accommodated through the passage 93 in the upper body 92 of the fixture 90 having an enlarged portion 112 with a greater depth for receiving the socket head of the collet locking screw 94 than the passage 71 (see FIG. 1) in the upper body 12 of the fixture 10 has for the socket head of the collet locking screw 70.

As a result, a bottom surface 115 (see FIG. 15) of each of the threads 107 on the lower separate portion 100 of each of the locking nuts 91 is moved into engagement with the upper surface 78 of some of the threads 66 on the collet 29 to compress the threads 107. This takes up the pitch clearance between the threads 66 on the collet 29 as shown in FIG. 15. It should be understood that the threads 107 have the same pitch as the pitch of the threads 66 on the collet 29.

The downward motion of the lower separate portion 100 also results in an upper surface 116 of each of the threads 107 on the upper separate portion 99 of each of the locking nuts 91 being engaged by the lower surface 76 of other of the threads 66. This occurs because taking up the pitch clearance between the threads 107 and 66 causes the lower surface 76 of each of the threads 66 to engage the upper surface 116 of each of the threads 107 on the upper separate portion 99.

By taking up the pitch clearance of the threads 66 on the collet 29, the collet 29 is locked against rotation. Thus, it is only necessary to rotate the collet locking screw 94 (see FIG. 11) from the top of the fixture 90 to lock the collet 29 against rotation. Accordingly, the same locking of the collet 29 against rotation occurs in the fixture 90 as in the fixture 10 (see FIG. 1).

The collet locking screw 94 is rotated in the opposite direction to release the collet 29 from the locking nut 91. The springiness of the metal of the locking nut 91 results in the lower separate portion.100 following the collet locking screw 94 as it moves away from exerting a force on the upper surface 106 of the lower separate portion 100.

Therefore, there is no necessity for any clearance on any side of the fixture 90 (see FIG. 11) for access thereto as is required by the collet retainer having the locking pin.

Figure 12:
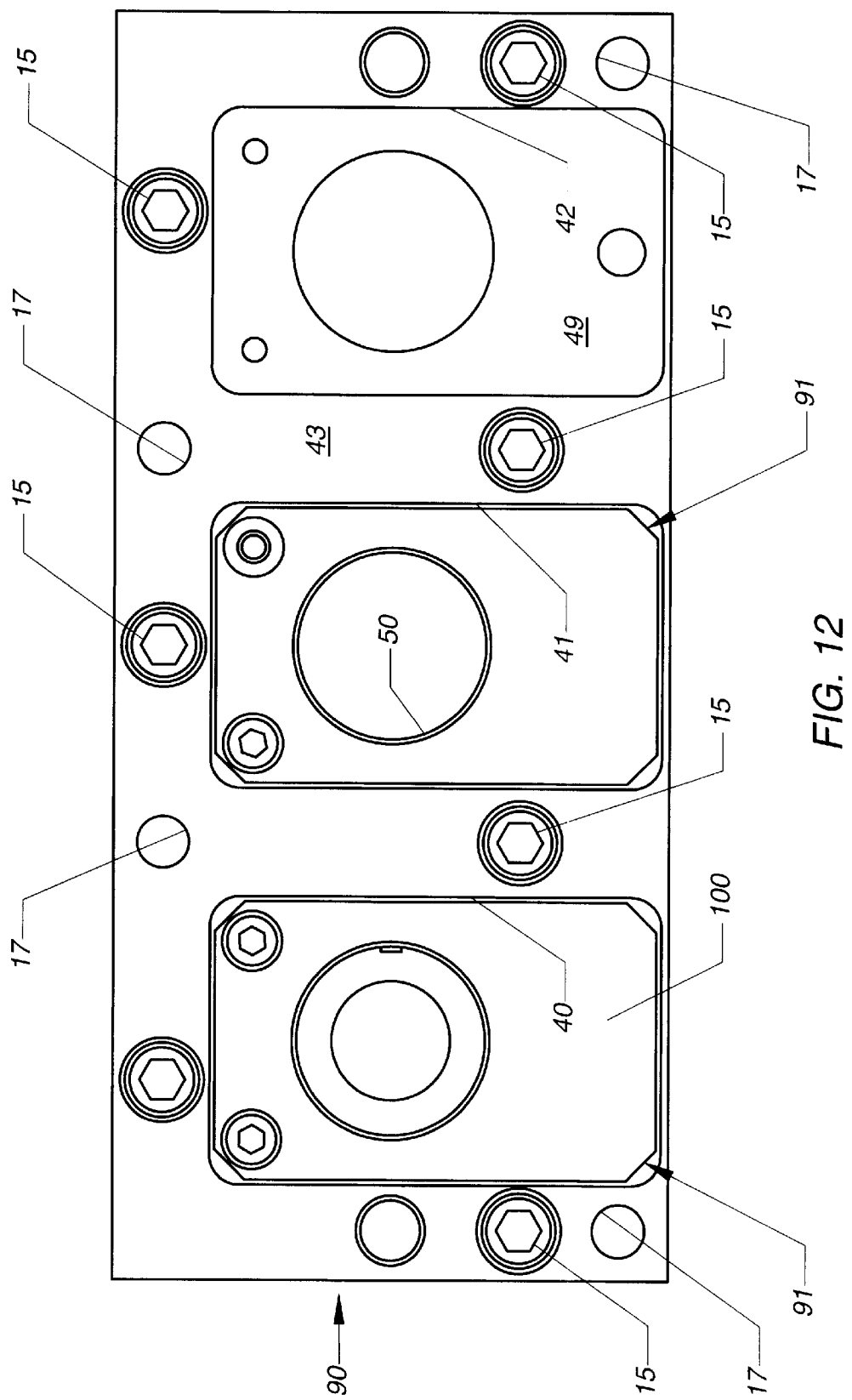
FIG. 12 is a bottom plan view of a fixture having the collet retainer of FIG. 11 and showing a first locking nut in a first recess cooperating with a collet, a second locking nut in a second recess having no collet, and a third recess in the fixture having no locking nut.

As shown in FIG. 12, the locking nut 91 does not have any hole extending through the lower separate portion 100 as does the locking nut 45 (see FIG. 6). Instead, only the threaded hole 110 (see FIG. 13) in the upper separate portion 99 of the locking nut 91 is used. Thus, the invention contemplates the locking nut 45 (see FIG. 1) or the locking nut 91 (see FIG. 11) having relative movement between the two separate portions 54 (see FIG. 1) and 55 of the locking nut 45 or the two separate portions 99 (see FIG. 11) and 100 of the locking nut 91. In either arrangement, there is compression of the threads 62 (see FIG. 6) in the circular passage 50 in the locking nut 45 or the threads 107 (see FIG. 13) in the circular passage 95 in the locking nut 91 to lock the collet 29 (see FIG. 11) against rotation.

While each of the locking nuts 45 (see FIG. 6) and 91 (see FIG. 13) has been shown and described as having one of the two separate portions 54 (see FIG. 6) and 55 of the locking nut 45 and one of the two separate portions 99 (see FIG. 13) and 100 of the locking nut 91 thicker than the other, it should be understood that such is not necessary although it is preferred. Accordingly, each of the two separate portions 54 (see FIG. 6) and 55 of the locking nut 45 could be the same thickness, if desired, as could each of the two separate portions 99 (see FIG. 13) and 100 of the locking nut 91.

While each of the fixtures 10 (see FIG. 1) and 90 (see FIG. 11) has been shown and described as having a plurality of the collets 29, it should be understood that there could be only one of the collets 29 in a single passage in a support body and constitute a collet retainer.

An advantage of this invention is that it does not require clearance between a plurality of collets in a fixture to enable access to lock each of the collets against rotation or to release each collet from being locked against rotation. Another advantage of this invention is that each collet can be disposed at any rotational position within a collet retainer.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A collet retainer for retaining a collet against rotation comprising:
   a support for rotatably supporting a collet receiving a workpiece to clamp the workpiece against movement when the collet is in its workpiece retaining position;
   collet moving means supported by said support for moving the collet rotatably supported thereby into its workpiece retaining position when said collet moving means is moved to a first position and for allowing the rotatably supported collet to cease to remain in its workpiece retaining position when said collet moving means is moved to a second position;
   and a locking nut carried by said support and cooperating with the rotatably supported collet to prevent rotation of the collet before the collet is moved to its workpiece retaining position by said collet moving means.

2. The collet retainer according to claim 1 including:
   said locking nut having threads therein for cooperating with threads on the outer surface of the collet rotatably supported by said support;
   and said threads in said locking nut having an interrupted portion for selected circumferential and axial distances to enable movement of said threads on said locking nut relative to the threads on the outer surface of the collet to cause compression of the thread pitch of said threads in said locking nut to prevent rotation of the collet.

3. The collet retainer according to claim 2 in which said locking nut has said interrupted portion of said threads removed for a circumferential portion for at least one selected axial distance to enable compression of the thread pitch of said threads.

4. The collet retainer according to claim 3 in which said interrupted portion of said threads is removed circumferentially for about 180° and is removed axially for more than one of said threads.

5. The collet retainer according to claim 1 in which:
   said support rotatably supports the collet at any rotatable position of the collet through 360°;
   and said locking nut prevents rotation of the collet from any rotatable position.

6. The collet retainer according to claim 1 comprising:
   said locking nut having threads of the same pitch as the pitch of threads on the outer surface of the collet for cooperating with the threads on the outer surface of the collet rotatably supported by said support;
   and changing means for changing the thread pitch of said threads on said locking nut to prevent rotation of the collet.

7. A collet retainer for retaining a collet against rotation comprising:
   a support for rotatably supporting a collet receiving a workpiece to clamp the workpiece against movement when the collet is in its workpiece retaining position;
   collet moving means supported by said support for moving the collet rotatably supported thereby into its workpiece retaining position when said collet moving means is moved to a first position and for allowing the rotatably supported collet to cease to remain in its workpiece retaining position when said collet moving means is moved to a second position;
   a locking nut carried by said support and cooperating with the rotatably supported collet to prevent rotation of the collet before the collet is moved to its workpiece retaining position by said collet moving means;
   said locking nut including a body having two substantially parallel surfaces;
   said body having a circular passage extending therethrough between said two substantially parallel surfaces for receiving the rotatably supported collet;
   said circular passage having threads of the same pitch as the pitch of threads on the outer surface of the collet for cooperating with the threads on the outer surface of the collet received in said circular passage;
   said threads in said circular passage in said body of said locking nut having an interrupted portion for selected circumferential and axial distances to enable movement of said threads in said circular passage in said body of said locking nut relative to the threads on the outer surface of the collet to cause compression of the thread pitch of said threads in said circular passage in said body of said locking nut to prevent rotation of the collet;
   said circular passage in said body of said locking nut having said interrupted portion of said threads removed for a circumferential portion for at least one selected axial distance to enable compression of the thread pitch of said threads therein;
   said body of said locking nut including:
      a main portion having two substantially parallel surfaces;

two separate portions extending from said main portion and integral therewith;

one of said two separate portions having a surface in the same plane as one of said two substantially parallel surfaces of said main portion to form a continuation thereof and constitute one of said two substantially parallel surfaces of said body;

and the other of said two separate portions having a surface in the same plane as the other of said two substantially parallel surfaces of said main portion to form a continuation thereof and constitute the other of said two substantially parallel surfaces of said body;

said circular passage having a circumferential portion in each of said main portion, said one separate portion, and said other separate portion;

and relative moving means for causing relative movement of one of said two separate portions of said body relative to the other of said two separate portions of said body to cause compression of the thread pitch of said threads in said circular passage in said body of said locking nut to remove their pitch clearance to prevent rotation of the collet rotatably supported by said support.

8. The collet retainer according to claim 7 including said relative moving means causing relative movement of the lowermost of said two separate portions of said body relative to the uppermost of said two separate portions of said body to cause compression of the thread pitch of said threads in said circular passage in said body of said locking nut to remove their pitch clearance to prevent rotation of the collet rotatably supported by said support.

9. The collet retainer according to claim 8 including said relative moving means causing relative movement of the lowermost of said two separate portions of said body toward the uppermost of said two separate portions of said body to cause compression of the thread pitch of said threads in said circular passage in said body of said locking nut to remove their pitch clearance to prevent rotation of the collet rotatably supported by said support.

10. The collet retainer according to claim 8 including said relative moving means causing relative movement of the lowermost of said two separate portions of said body away from the uppermost of said two separate portions of said body to cause compression of the thread pitch of said threads in said circular passage in said body of said locking nut to remove their pitch clearance to prevent rotation of the collet rotatably supported by said support.

11. The collet retainer according to claim 7 in which said collet moving means includes a piston slidably supported by said support for moving the collet into its workpiece retaining position when said piston is moved to a first position and allowing the collet to move out of its workpiece retaining position when said piston is moved to a second position.

12. The collet retainer according to claim 11 in which said interrupted portion of said threads is removed circumferentially for about 180° and is removed axially for more than one thread.

13. The collet retainer according to claim 7 in which said interrupted portion of said threads is removed circumferentially for about 180° and is removed axially for more than one thread.

14. The collet retainer according to claim 7 including limit means on one of said two separate portions of said body of said locking nut for limiting movement of said one separate portion relative to the other of said two separate portions.

15. In combination:

a collet for supporting a workpiece in a clamped position when said collet is in its workpiece retaining position;

a support for rotatably supporting said collet;

collet moving means supported by said support for moving said collet into its workpiece retaining position when said collet moving means is moved to a first position and for allowing said collet to cease to remain in its workpiece retaining position when said collet moving means is moved to a second position;

and a locking nut carried by said support and cooperating with said collet to prevent rotation of said collet before said collet is moved to its workpiece retaining position by said collet moving means.

16. The combination according to claim including:

one end of said collet having threads on its outer surface;

said locking nut including a body having two substantially parallel surfaces;

said body having a circular passage extending therethrough between said two substantially parallel surfaces for receiving said one end of said collet;

said circular passage having threads of the same pitch as the pitch of said threads on the outer surface of said collet for cooperating with said threads on the outer surface of said collet;

and said threads in said circular passage in said body of said locking nut having an interrupted portion extending for selected circumferential and axial distances to enable movement of said threads in said circular passage in said body of said locking nut relative to said threads on the outer surface of said collet to cause compression of the thread pitch of said threads in said circular passage in said body of said locking nut to prevent rotation of said collet.

17. The combination according to claim 16 in which said circular passage in said body of said locking nut has said interrupted portion of said threads removed for a circumferential portion for at least one selected axial distance to enable compression of the thread pitch of said threads therein.

18. The combination according to claim 17 in which said interrupted portion of said threads is removed circumferentially for about 180° and is removed axially for more than one thread.

19. The combination according to claim 15 in which:

said support rotatably supports said collet at any rotatable position of said collet through 360°;

and said locking nut prevents rotation of said collet from any rotatable position.

20. The combination according to claim 15 comprising:

said locking nut having threads of the same pitch as the pitch of threads on the outer surface of said collet for cooperating with the threads on the outer surface of said collet rotatably supported by said support;

and changing means for changing the thread pitch of said threads on said locking nut to prevent rotation of said collet.

21. In combination:

a collet for supporting a workpiece in a clamped position when said collet is in its workpiece retaining position;

a support for rotatably supporting said collet;

collet moving means supported by said support for moving said collet into its workpiece retaining position when said collet moving means is moved to a first position and for allowing said collet to cease to remain in its workpiece retaining position when said collet moving means is moved to a second position;

a locking nut carried by said support and cooperating with said collet to prevent rotation of said collet before said collet is moved to its workpiece retaining position by said collet moving means;

one end of said collet having threads on its outer surface;

said locking nut including a body having two substantially parallel surfaces;

said body having a circular passage extending therethrough between said two substantially parallel surfaces for receiving said one end of said collet;

said circular passage having threads of the same pitch as the pitch of said threads on the outer surface of said collet for cooperating with said threads on the outer surface of said collet;

said threads in said circular passage in said body of said locking nut having an interrupted portion extending for selected circumferential and axial distances to enable movement of said threads in said circular passage in said body of said locking nut relative to said threads on the outer surface of said collet to cause compression of the thread pitch of said threads in said circular passage in said body of said locking nut to prevent rotation of said collet;

said interrupted portion of said threads in said circular passage being removed for a circumferential portion for at least one selected axial distance to enable compression of the thread pitch of said threads therein;

said body of said locking nut including:
a main portion having two substantially parallel surfaces;
two separate portions extending from said main portion and integral therewith;
one of said two separate portions having a surface in the same plane as one of said two substantially parallel surfaces of said main portion to form a continuation thereof and constitute one of said two substantially parallel surfaces of said body;
and the other of said two separate portions having a surface in the same plane as the other of said two substantially parallel surfaces of said main portion to form a continuation thereof and constitute the other of said two substantially parallel surfaces of said body;

said circular passage having a circumferential portion in each of said main portion, said one separate portion, and said other separate portion;

and relative moving means for causing relative movement of one of said two separate portions of said body relative to the other of said two separate portions of said body to cause compression of the thread pitch of said threads in said circular passage in said body of said locking nut to remove their pitch clearance to prevent rotation of the collet rotatably supported by said support.

22. The combination according to claim 21 including said relative moving means causing relative movement of the lowermost of said two separate portions of said body relative to the uppermost of said two separate portions of said body to cause compression of the thread pitch of said threads in said circular passage in said body of said locking nut to remove their pitch clearance to prevent rotation of said collet rotatably supported by said support.

23. The combination according to claim 22 including said relative moving means causing relative movement of the lowermost of said two separate portions of said body toward the uppermost of said two separate portions of said body to cause compression of the thread pitch of said threads in said circular passage in said body of said locking nut to remove their pitch clearance to prevent rotation of said collet rotatably supported by said support.

24. The combination according to claim 22 including said relative moving means causing relative movement of the lowermost of said two separate portions of said body away from the uppermost of said two separate portions of said body to cause compression of the thread pitch of said threads in said circular passage in said body of said locking nut to remove their pitch clearance to prevent rotation of said collet rotatably supported said support.

25. The combination according to claim 21 which said collet moving means includes a piston slidably supported by said support for moving said collet into its workpiece retaining position when said piston is moved to a first position and allowing said collet to move out of its workpiece retaining position when said piston is moved to a second position.

26. The combination according to claim 25 in which said interrupted portion of said threads is removed circumferentially for about 180° and is removed axially for more than one thread.

27. The combination according to claim 21 in which said interrupted portion of said threads is removed circumferentially for about 180° and is removed axially for ore than one thread.

28. The combination according to claim 21 including limit means on one of said two separate portions of said body of said locking nut for limiting movement of said one separate portion relative to the other of said two separate portions.

29. A fixture comprising:
a main body;
a plurality of collets rotatably supported by said main body in substantially parallel axial relation to each other, each of said collets supporting a workpiece in a clamped position when said collet is in its workpiece retaining position;
separate collet moving means supported by said main body for simultaneously moving each of said collets into its workpiece retaining position when each of said separate collet moving means is simultaneously moved to a first position and for allowing each of said collets to cease to remain in its workpiece retaining position when each of said separate collet moving means is simultaneously moved to a second position;
a plurality of locking nuts carried by said main body;
and each of said of locking nuts cooperating with one of said collets to prevent rotation of said collet before each of said collets is simultaneously moved to its workpiece retaining position by one of said separate collet moving means.

30. The fixture according to claim 29 including: one end of each of said collets having threads on its outer surface;
each of said locking nuts including a body having two substantially parallel surfaces;
said body having a circular passage extending therethrough between said two substantially parallel surfaces for receiving said one end of one of said collets;
said circular passage in each of said bodies having threads of the same pitch as the pitch of said threads on the outer surface of each of said collets for cooperating with said threads on the outer surface of said collet received in said circular passage;

and said threads in said circular passage in said body of each of said locking nuts having an interrupted portion extending for selected circumferential and axial distances to enable movement of said threads in said circular passage in said body of each of said locking nuts relative to said threads on the outer surface of one of said collets to cause compression of the thread pitch of said threads in said circular passage in said body of each of said locking nuts to prevent rotation of said collets.

31. The fixture according to claim 30 in which said circular passage in said body of each of said locking nuts has said interrupted portion of said threads removed for a circumferential portion for at least one selected axial distance to enable compression of the thread pitch of said threads therein.

32. The fixture according to claims 31 in which said interrupted portion of said threads is removed circumferentially for about 180° and is removed axially for more than one thread.

33. The fixture according to claim 25 in which: said main body rotatably supports each of said collets at any rotatable position of each of said collets through 360°;

and each of said locking nuts prevents rotation from any rotatable position of said collet cooperating therewith.

34. The fixture according to claim 29 in comprising:

each of said locking nuts having threads of the same pitch as the pitch of threads on the outer surface of one of said collets for cooperating with the threads on the outer surface of said one collet rotatably supported by said main body;

and separate changing means for changing the thread pitch of said threads on each of said locking nuts to prevent rotation of said collet cooperating therewith.

35. A fixture comprising:

a main body;

a plurality of collets rotatably supported by said main body in substantially parallel axial relation to each other, each of said collets supporting a workpiece in a clamped position when said collet is in its workpiece retaining position;

separate collet moving means supported by said main body for simultaneously moving each of said collets into its workpiece retaining position when each of said separate collet moving means is simultaneously moved to a first position and for allowing each of said collets to cease to remain in its workpiece retaining position when each of said separate collet moving means is simultaneously moved to a second position;

a plurality of locking nuts carried by said main body;

each of said locking nuts cooperating with one of said collets to prevent rotation of said collet before each of said collets is simultaneously moved to its workpiece retaining position by one of said separate collet moving means;

one end of each of said collets having threads on its outer surface;

each of said locking nuts including a body having two substantially parallel surfaces;

said body of each of said locking nuts having a circular passage extending therethrough between said two substantially parallel surfaces to receive said one end of said collet;

said circular passage in each of said bodies having threads of the same pitch as the pitch of said threads on the outer surface of each of said collets for cooperating with said threads on the outer surface of said collet received in said circular passage;

said threads in said circular passage in said body of each of said locking nuts having an interrupted portion extending for selected circumferential and axial distances to enable movement of said threads in said circular passage in said body of each of said locking nuts relative to said threads on the outer surface of one of said collets to cause compression of the thread pitch of said threads in said circular passage in said body of each of said locking nuts to prevent rotation of said collets;

said interrupted portion of said threads in said circular passage in said body of each of said locking nuts being removed for a circumferential portion for at least one selected axial distance to enable compression of the thread pitch of said threads therein;

said body of each of said locking nuts including:

a main portion having two substantially parallel surfaces;

two separate portions extending from said main portion and integral therewith;

one of said two separate portions having a surface in the same plane as one of said two substantially parallel surfaces of said main portion to form a continuation thereof and constitute one of said two substantially parallel surfaces of said body;

and the other of said two separate portions having a surface in the same plane as the other of said two substantially parallel surfaces of said main portion to form a continuation thereof and constitute the other of said two substantially parallel surfaces of said body;

said circular passage in said body in each of said locking nuts having a circumferential portion in each of said main portion, said one separate portion, and said other separate portion;

and separate relative moving means for causing relative movement of one of said two separate portions of said body of each of said locking nuts relative to the other of said two separate portions of said body of each of said locking nuts to prevent rotation of said collet rotatably supported by said main body.

36. The fixture according to claim 35 including each of said separate relative moving means causing relative movement of the lowermost of said two separate portions of said body of each of said locking nuts relative to the uppermost of said two separate portions of said body of each of said locking nuts to cause compression of the thread pitch of said threads in said circular passage in said body of each of said locking nuts to remove their pitch clearance to prevent rotation of each of said collets rotatably supported by said main body.

37. The fixture according to claim 36 including each of said separate relative moving means causing relative movement of the lowermost of said two separate portions of said body of each said locking nuts toward the uppermost of said two separate portions of said body of each of said locking nuts to cause compression of the thread pitch of said threads in said circular passage in said body of each of said locking nuts to remove their pitch clearance to prevent rotation of each of said collets rotatably supported by said main body.

38. The fixture according to claim 36 including each of said separate relative moving means causing relative movement of the lowermost of said two separate portions of said body of each of said locking nuts away from the uppermost of said two separate portions of said body of each of said locking nuts to cause compression of the thread pitch of said threads in said circular passage in said body of each of said locking nuts to remove their pitch clearance to prevent rotation of each of said collets rotatably supported by said main body.

39. The fixture according to claim 35 in which each of said separate collet moving means includes a piston slidably supported by said main body for simultaneously moving one of said collets into its workpiece retaining position when each of said pistons is simultaneously moved to a first position and allowing said one collet to move out of its workpiece retaining position when each of said pistons is simultaneously moved to a second position.

40. The fixture according to claim 39 in which said interrupted portion of said threads in said circular passage in said body of each of said locking nuts is removed circumferentially for about 180° and is removed axially for more than one thread.

41. The fixture according to claim 35 in which said interrupted portion of said threads in said circular passage in said body of each of said locking nuts is removed circumferentially for about 180° and is removed axially for more than one thread.

42. The fixture according to claim 35 including limit means on one of said two separate portions of said body of each of said locking nuts for limiting movement of said one separate portion relative to the other of said two separate portions.

* * * * *

UNITED STATES PATENT AND TRADEMARK OFFICE
CERTIFICATE OF CORRECTION

PATENT NO. : 6,557,860 B1 Page 1 of 1
DATED : May 6, 2003
INVENTOR(S) : Clifford W. Allen, III et al.

It is certified that error appears in the above-identified patent and that said Letters Patent is hereby corrected as shown below:

Column 6,
Line 62, "portion.100" should read -- portion 100 --

Column 10,
Lines 16-19, should read
16. The combination according to claim 15 including:
one end of said collet having threads on its outer surface;
said locking nut including a body having two substantially
  parallel surface;

Column 12,
Line 30, "ore" should read -- more --
Lines 58 and 59, should read
30. The fixture according to claim 29 including:
one end of each of said collets having threads on its outer
  surfaces;

Column 13,
Lines 23-25,
33. The fixture according to claim 29 in which"
said main body rotatably supports each of said collets at any
  rotatable position of each of said collets through 360°;
Line 29, cancel "in"

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,557,860 B1
DATED : May 6, 2003
INVENTOR(S) : Clifford W. Allen, III et al.

It is certified that error appears in the above-identified patent and that said Letters Patent is hereby corrected as shown below:

Column 6,
Line 62, "portion.100" should read -- portion 100 --

Column 10,
Lines 16-19, should read
16. The combination according to claim 15 including:
one end of said collet having threads on its outer surface;
said locking nut including a body having two substantially
 parallel surfaces;

Column 12,
Line 30, "ore" should read -- more --
Lines 58 and 59, should read
30. The fixture according to claim 29 including:
one end of each of said collets having threads on its outer
 surface;

Column 13,
Lines 23-25,
33. The fixture according to claim 29 in which:
said main body rotatably supports each of said collets at any
 rotatable position of each of said collets through 360°;
Line 29, cancel "in"

This certificate supersedes Certificate of Correction issued September 9, 2003.

Signed and Sealed this

Fourteenth Day of October, 2003

JAMES E. ROGAN
*Director of the United States Patent and Trademark Office*